Oct. 31, 1950     F. B. BRISTOL     2,528,336

RELAY SYSTEM

Filed May 21, 1945

INVENTOR.
Franklin B. Bristol
BY
E. C. Sanborn
Attorney

Patented Oct. 31, 1950

2,528,336

UNITED STATES PATENT OFFICE 2,528,336

RELAY SYSTEM

Franklin B. Bristol, Middlebury, Conn., assignor to The Bristol Company, Waterbury, Conn., a corporation of Connecticut Application May 21, 1945, Serial No. 594,907

13 Claims. (Cl. 175—320)

This invention relates to relay systems, and more especially to a combination of a control relay with a contact-making galvanometer or millivoltmeter for the automatic regulation of temperature or other variable magnitude expressible as a unidirectional electrical potential adapted to the actuation of such an instrument. In the operation of a relay by means of a contact-making galvanometer or the like, the property of high sensitivity which normally characterizes the latter instrument is obviously incompatible with positive contact engagement desirable for energization of relay circuits without objectionable chattering and consequent burning of contact points. In order to obtain the desired positive contact action without at the same time sacrificing sensitivity of galvanometer performance, it has been customary to provide various mechanical relay mechanisms, involving "choppers," depressors, or the like, whereby a delicate pointer is momentarily intercepted in its deflected position and included in a mechanical train, to actuate the necessary circuit-controlling members, and is subsequently released and left free again to assume a position representative of a measured magnitude, or of the deviation of said magnitude from a predetermined value.

Mechanical contact-making devices of the above nature are obviously subject to many objections, among which may be mentioned complication and high cost together with the feature that the measuring unit is periodically inhibited from its normal function of providing a measure of the regulated magnitude, and is therefore available to perform such a function for only a portion of the total time.

It is an object of the present invention to provide control means whereby a sensitive pointer actuating measuring element is free to deflect in response to small changes in a measured magnitude, and directly to actuate engaging contact members, which, upon engagement, initiate such influences as will tend to amplify the force of engagement until the desired action of operating a relay or the like is effected, whereupon the auxiliary force is removed, and the measuring element left free to assume a position representative of the measured magnitude.

It is a further object to provide a system of the above type in which the pressure amplifying function shall be inherent in the control apparatus without the addition of auxiliary mechanisms.

In effecting the purposes of the invention, it is proposed to provide in an electrical control system a single relay subject to the actuation of a contact-making galvanometer or millivoltmeter, and to provide in conjunction with the same an auxiliary circuit whereby upon energization of the control circuit in a sense either to open or close the main relay contacts, there will be caused to pass through the winding of said galvanometer or millivoltmeter an auxiliary current tending to amplify the contact-making force, said current continuing to flow until actuation of said relay has been completed.

Figure 1:
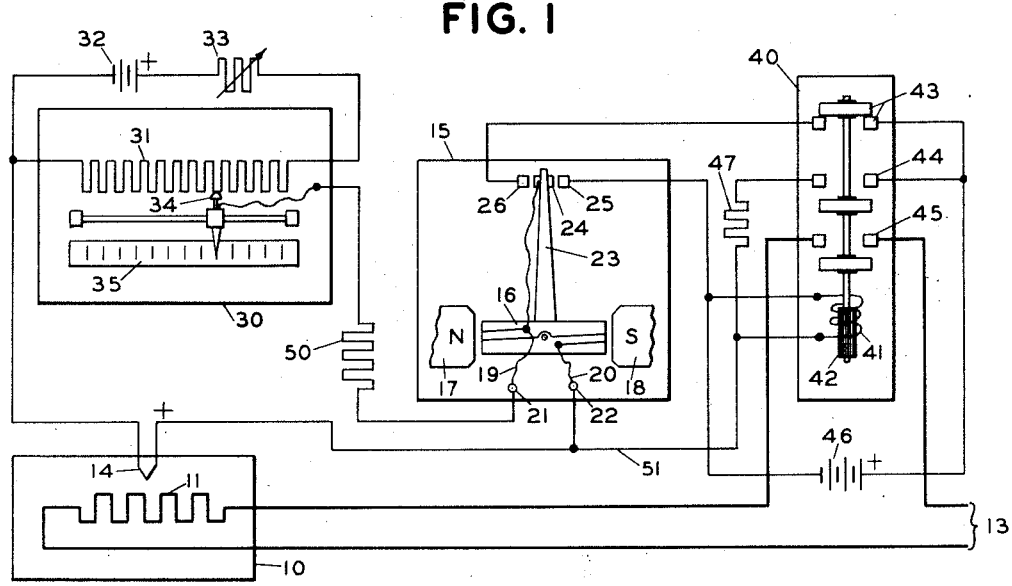
Fig. 1 is a diagrammatic representation of an electrical temperature control system embodying the principles of the invention in combination with a temperature measuring system of the adjustable potentiometric class.

Referring now to the drawings:

The numeral 10 designates a furnace or other unit whose temperature it is required to modify by means of a resistor type of heating element 11 adapted to receive electric power from a suitable source 13, and whose temperature may be determined by a thermocouple 14 suitably positioned in said furnace. A galvanometer 15 comprises a coil 16 adapted for limited angular deflection between magnet poles 17 and 18 in a direction depending upon that of current flow in said coil. The coil 16 is connected by suitable flexible leads 19 and 20, which may also perform the function of control springs, to terminals 21 and 22. Attached to the coil 16 and movable therewith is a pointer 23 carrying a contact element 24 connected to the side of the coil 16 to which also is connected the flexible lead 19, and adapted to deflect between, and alternatively engage, stationary contacts 25 and 26, according to the direction of deflection of the coil 16.

A combined temperature measuring and control-point setting device is designated by the numeral 30. This device combines a potentiometer-type slide-wire rheostat 31 adapted to be continuously supplied from a battery 32 with a direct current whose magnitude may be adjusted to a suitable value by means of a rheostat 33. Cooperating with the slide-wire 31 is a movable contact 34, which may be set, manually or otherwise, at any desired point upon said slide-wire, its position, and consequently its potential with respect to a selected end of said slide-wire, being indicated upon a suitable graduated scale 35.

A relay, combining the functions of interlocking and control, is designated by the numeral 40. Said relay includes a winding or solenoid 41 adapted when energized to actuate an armature or plunger 42 and thereby to control three independent sets of contacts 43, 44 and 45, the first of said contacts being normally closed when said solenoid is deenergized and open when it is energized, and the contacts 44 and 45 being normally open when the said solenoid is deenergized and closed when it is energized. A battery 46 or other suitable source of direct current is adapted to supply power for energizing the solenoid 41; and a resistor 47, whose resistance value may be determined by a method hereinafter to be described, is associated with said relay and galvanometer in a manner and for a purpose which will presently be set forth.

For the sake of clarity in explaining the connections of the system as above described, the several sources of unidirectional E. M. F. embodied in the network have been assigned polarities; but it will be understood that these are only relative, and that no change in performance would result were all said polarities to be reversed. The positive terminal of the battery 32 is connected through the rheostat 33 to one end of the potentiometer-type slide-wire rheostat 31; and the negative terminal of said battery to the opposite end of said slide wire, which end is also connected to the negative terminal of the thermocouple 14. The positive terminal of the thermocouple 14 is connected to the terminal 22 of the galvanometer 15; and the terminal 21 of said galvanometer is connected, in series with a current-limiting resistor 50 to the adjustable contact 34 of the rheostat 31. The network including the slide-wire 31, the galvanometer coil 16 and the thermocouple 14 may, for convenience be known as the "measuring circuit." It will be apparent that when the potential developed by the thermocouple 14 is equal to that between the contact 34 and the terminal of the rheostat 31 to which one terminal of the couple is attached the net E. M. F. in the measuring circuit will be zero, and there will be no potential therefrom applied to the coil 16 of the galvanometer 15, with a resultant tendency of the latter to rest in its neutral or zero position, with its contacts separated. It will further be obvious that, by selectively modifying the value of voltage derived from the rheostat 31 by varying the setting of the contact 34, the thermocouple potential required to bring about this null condition will be correspondingly varied, and that the temperature so represented may be read from the graduated scale 35. The polarity of the galvanometer coil 16 is so related to that of the magnet poles 17 and 18 that, upon the potential developed by the couple 14 exceeding that derived from the slide-wire 31, corresponding to an increase in the temperature to which the couple is exposed, said coil will be deflected in a sense to bring contact elements 24 and 25 into engagement, while with a decrease of temperature, the contact elements 24 and 26 will be similarly engaged.

One side of each of the relay contacts 43 and 44 is connected to the positive terminal of the battery 46. The free side of the normally closed contacts 43 is connected to the galvanometer contact 26; and the contact 25 is directly connected to the negative terminal of said battery, which terminal is also connected in series with the solenoid 41 of the relay 40 to the galvanometer terminal 22. The resistor 47 is connected to the free side of normally open relay contacts 44, and, by means of a conductor 51 to the galvanometer terminal 22. The normally open contacts 45 of the relay 40 are connected in series with the heater 11 and the source 13, whereby may be had control of said heater by said relay.

Operation of the device in the form set forth may be described as follows: Assuming first a condition of balance, in which the temperature of the thermocouple 14 agrees with the setting of the contact 34 as indicated on the scale 35, the net potential in the measuring circuit will be zero and the galvanometer will rest in its neutral position. The contact element 24 not being in engagement with either of the contact elements 25 or 26, no circuit through the battery 46 will be completed. Assuming the solenoid 41 to be deenergized, the contacts 43 of the relay 40 will be closed and the contacts 44 and 45 opened. Thus, the heater 11 will remain de-energized, and the furnace or oven 10 will tend to become cooler.

As the temperature of the couple 14 falls, its potential will become less than that corresponding to the setting of the arm 34, and unbalance current will flow through the galvanometer coil 16 in a sense to deflect the contact 24 toward the contact 26. As said contacts come into engagement there will be completed a circuit from the battery 46 through said contact elements, in series with contacts 43 and the galvanometer coil 16, to energize the solenoid 41 and actuate the relay 40. The current from the battery 46 flowing through the coil 16 will, it will be observed, flow in the same direction as the original unbalance current, thus acting as auxiliary to the same and tending to accentuate or amplify the force of contact engagement, and eliminate any tendency toward such uncertainty or chattering as would normally tend to characterize a contact made only by the relatively light pressure available from the galvanometer action alone. Under the influence of the action of the solenoid 41 upon the plunger 42, the relay 40 will operate in a sense to open contacts 43 and at the same time to close contacts 44 and contacts 45. The closing of contacts 44 will provide a path for current from the battery 46 through solenoid 41 and resistor 47 in series, whereby to lock the relay in its actuated position without respect to engagement or disengagement of contact elements 24—26. Opening of contacts 43 will break the circuit of the auxiliary current from the battery 46 through the galvanometer coil, leaving the latter subject solely to the influence of current in the measuring circuit. Closing of the contacts 45 will cause the heater 11 to be energized from the source 13, whereby to supply heat to the furnace or oven 10 and correct the temperature condition responsible for the original deflection of the galvanometer.

So long as the controlled temperature continues low, the galvanometer contacts 24—26 will remain in engagement, but, the relay 40 being locked with contacts 43 open, no current will flow through said contacts 24—26, and the galvanometer will be free to swing away from its deflected position as the potentiometer and thermocouple voltages approach equality. As opening of the contacts 43 has broken the only circuit through galvanometer contacts 24—26, the latter as they separate, will not be required to break any current. Also, no control effect will be produced by the galvanometer attaining its zero or neutral position, and the relay will remain energized, maintaining heater 11 in circuit until the regulated temperature exceeds the setting on the scale 35 sufficiently to cause the contact elements 24 and 25 to be brought into engagement.

Upon the temperature of the couple 14 attaining a value at which the thermoelectromotive force exceeds that derived from the slide-wire 31, unbalance current will flow through the galvanometer coil 16 in a sense to deflect the pointer 23 to bring the contacts 24—25 together, whereby the coil 16 will be shunted across the solenoid 41. The measuring circuit also will be shunted across the coil 41; but the resistance 50 is made of such value with respect to other elements of the network that resultant flow of current therein will be relatively inappreciable. The galvanometer coil 16 and the solenoid 41 now being in parallel with each other, and in series with resistor 47 and the contacts 44, which are connected to the positive terminal of the battery 46, the path of current from said terminal may be traced through said last-named contacts and the resistor 47, dividing to pass in part through the solenoid and in part through the coil. The direction of flow of current through the galvanometer coil will be the same as that derived from the measuring circuit, and responsible for the original deflection in response to increased temperature, whereby the force of engagement of the contacts 24—25 will be amplified, as was the case when the contacts 24—26 were brought together, with elimination of uncertainty of engagement and possible chattering. The relative resistance values of the several elements of the circuit are such that, while the current passing through the resistor 47 and the solenoid 41 directly in series across the battery 46 will develop in the solenoid sufficient field to retain the plunger or armature 42 and maintain the relay in its energized position, shunting of the solenoid by the resistance of the galvanometer coil will cause sufficient current to be diverted therefrom to weaken the solenoid below its holding point and cause the relay to be released, whereupon the contact assembly will revert to its original condition (under the action of a suitable spring) with contacts 43 closed and contacts 44 and 45 opened, thus cutting the heater 11 out of circuit and allowing the temperature of the oven or furnace 10 to fall.

It will be noted that, while the galvanometer contacts are required to carry the current diverted from the solenoid 41 until the resultant release of the relay, this current is included in that broken at the contacts 44, so that, as is the case when the galvanometer acts to energize the relay, the galvanometer contacts are not required to break any current. In order that the intensifying effect of the auxiliary current through the galvanometer coil 16 be uniform in either direction of deflection of the galvanometer, it is desirable that the value of such current be the same, whether the circuit be completed between contacts 24—25 or contacts 24—26. This condition is not critical, and where, as may frequently be the case, the resistance of the galvanometer coil is very low in comparison to that of the solenoid (e. g. of the order of 1/100), it will be sufficient that the series resistor 47 and the solenoid 41 have approximately equal resistance values. If design conditions require that the galvanometer coil have an appreciable resistance value in relation to the solenoid it may be necessary to take the relative values into consideration. It has been found that the resistance of unit 47 may be computed for any combination of galvanometer and solenoid resistances by the use of the following formula:

$$R_r = \frac{R_s^2}{R_g + R_s}$$

in which $R_r$ designates the value of the resistor 47,
$R_s$ designates the value of the solenoid 41 and
$R_g$ designates the value of the galvanometer coil 16.

Figure 2:
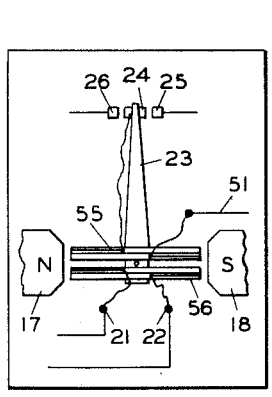
Fig. 2 is an elevation of alternative form of galvanometer adapted to the system of measurement and control indicated in Fig. 1.

In Fig. 2 is shown an alternative form of galvanometer applicable to the purposes of the invention, said galvanometer differing from that shown in Fig. 1 to the extent of having separate windings, whereby the measuring circuit may be isolated from the control circuit. Instead of the single coil 16, as indicated in Fig. 1, there are provided two coils 55 and 56 integrally mounted and adapted to deflect as a unit between the magnet poles 17—18. The pointer arm 23 and the contact element 24 carried thereby, deflectable between stationary contacts 24 and 25, are identical in all ways with the corresponding parts shown in Fig. 1. One terminal of the coil 55 is connected to the movable contact element 24, and the other terminal to the conductor 51 (otherwise connected as shown in Fig. 1). The winding of coil 56 is connected to the terminals 21—22; and all connections thereto (excepting the conductor 51) are identical with those shown in Fig. 1. Relative polarities of the windings 55 and 56 are made to correspond with that of the coil 16 in Fig. 1, whereupon it will be seen that performance of the galvanometer, both with respect to its initial deflection and its amplified engagement of coacting contact elements, will be the same as that hereinbefore set forth. The use of separate windings for the currents originating in the measuring and control circuits respectively promotes increased flexibility of design, in that different numbers of turns, and different resistance values may be used for the two movable windings of the galvanometer. Where complete isolation between the circuits is not necessary the two galvanometer windings may be given a common terminal (e. g., terminal 22) whereupon the connections external to the galvanometer would become identical to those shown in Fig. 1. Where the circuits are mutually isolated, as shown in Fig. 2, flexibility of arrangement is made possible by the fact that either circuit may, if desired, be grounded independently of the other, and that the measuring circuit is protected from inductive effects due to operation of the relay 40.

Figure 3:
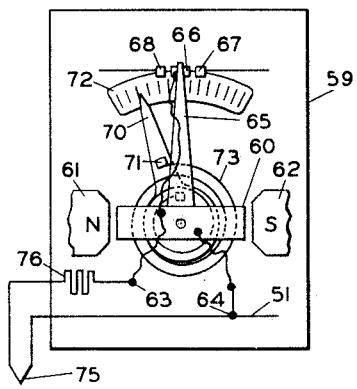
Figs. 3 and 4 are elevations of two forms of direct deflecting pyrometer instruments adapted to the purposes of the invention.

In Fig. 3 is shown the application of the invention to a measuring circuit embodying the conventional deflecting pyrometer principle. A pyrometer instrument 59 includes a movable coil 60 pivoted for angular deflection between magnet poles 61 and 62, and is connected by means of flexible leads to terminals 63 and 64. Attached to the coil 60 and movable therewith is a pointer 65 carrying a contact element 66 adapted to deflect between, and alternatively engage stationary contacts 67 and 68, according to the direction of deflection of the coil 60. Mounted concentrically with the axis of deflection of the coil 60, and adjustable thereabout is an arm 70 carrying a spring abutment 71, and terminating in an index or pointer portion adapted to provide on a stationary scale 72 a measure of the adjusted position of said arm. Extended between the abutment 71 and a suitable attachment on the pointer 65 is a spiral restraining spring 73, whereby to provide a counter torque to the reaction of current in the coil 60 upon the field of the magnet poles 61—62, and thereby a measure of such current. The pyrometer circuit includes a thermocouple 75 exposed to the temperature to be regulated and connected in series with a suitable current limiting resistor 76 directly to the terminals 63—64. The same side of the coil 60 as is connected to the terminal 63 is also connected to the movable contact 66; and the remainder of the control circuit connections are identical with those shown in Fig. 1, contact elements 67 and 68 being connected as contact elements 25 and 26 in Fig. 1, and the galvanometer terminal 64 to the conductor 51.

Operation of the forms of the invention shown in Fig. 3 differs from that shown in Fig. 1 only in the functioning of the measuring circuit including the thermocouple 75, and this element per se presents no novelty. According to the temperature of the couple, there will normally flow in the coil 60 current whose value will be limited by the series resistor 76. The reaction of this current upon the magnetic field in which said coil is pivoted will develop a torque opposing that of the control spring 73, whereby the pointer 65 will tend to come to equilibrium in a definite position. The reaction of the spring 73, and hence the temperature value represented by a state of equilibrium in which the contact element 66 tends to float between the contact elements 67 and 68, may be varied by adjustment of the angular position of the arm 70; so that the scale 72 may be calibrated in terms of said temperature. The control circuit, functioning exactly as the corresponding circuit shown in Fig. 1, will tend to maintain the temperature of the couple at a value represented by the setting of the arm 70; and, as set forth in explanation of said Fig. 1, current derived from the control circuit and passing through the galvanometer coil via conductor 51 and either of the contact elements 67—68, will tend to amplify the force of galvanometer deflection in either direction, thus ensuring positive engagement and eliminating possible chattering and burning of the contact points.

Figure 4:
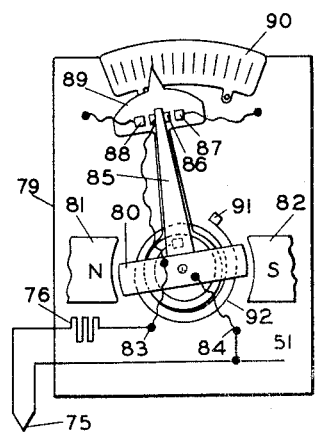

The form of the invention shown in Fig. 4 is an alternative application of the direct-deflecting pyrometer principle, and differs from that shown in Fig. 3 only in the feature that adjustment of the control point is effected by modifying the setting of the stationary contact elements instead of by varying the action of the control spring. A pyrometer instrument 79 includes a movable coil 80 pivoted for angular deflection between magnet poles 81 and 82, and is connected by means of flexible leads to terminals 83 and 84. Attached to the coil 80 and movable therewith is a pointer 85 carrying a contact 86 electrically connected to the terminal 83. Normally stationary contacts 87 and 88 alternatively engageable by the contact 86 are mounted upon an arm or boom 89 pivoted for adjustment through a limited angle about the axis of rotation of the coil 81, and terminating in an index or pointer portion adapted to provide upon a stationary graduated scale 90 an indication of the adjusted position of said arm or boom. Extended between a suitable attachment on the pointer arm 85 and a fixed abutment 91 is a spiral restraining spring 92 whereby to determine the deflected position which the coil 80 and attached pointer 85 will tend to assume for any given value of current in the winding of the former. The external circuits, both measuring and control, associated with the pyrometer 79 are identical with those shown for the instrument 59 in Fig. 3, the measuring circuit including the thermocouple 75 and current-limiting resistor 76 connected directly to the terminals 83—84, to the latter of which is also connected the control circuit conductor 51, and the contact elements 87 and 88 being connected as are contact elements 25 and 26 respectively shown in Fig. 1.

Operation of the form of invention shown in Fig. 4 is essentially similar to that of the form shown in Fig. 3. The force developed by current from the thermocouple 75 flowing the coil 80 will be opposed by the torque of the spring 92, so that the pointer 85 will tend to assume a definite position which will be a measure of the temperature to which said couple is exposed. If said position is such that the contact element 86 floats between the contact elements 87—88, no actuation of the control circuit will take place. If either of said last-named contact elements is engaged by the contact 86, the control circuit will function in the manner hereinbefore set forth, the force of engagement of the coacting contact elements being amplified to prevent undesirable uncertainty in action, the relay acting to correct the temperature deviation responsible for the deflection of the pyrometer pointer, and at the same time interrupting the auxiliary contacting influence, whereby the pyrometer element is left free to provide a true measure of the temperature of the couple. It will be obvious that the tendency will be to regulate said temperature to a value intermediate those represented by the angular positions of the contact elements 87—88, and that setting of the control point may thus be established by angular adjustment of the arm or boom 89, the magnitude of said setting being indicated by the index portion of said boom in relation to the graduated scale 90. It will further be apparent that the double-coil arrangement shown in Fig. 2 may also be applied to the pyrometer-type instruments shown in Figs. 3 and 4.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination with a galvanometer comprising an element deflectable in a direction corresponding to a change in a variable, an electric contact movable by said element, and a pair of contacts alternatively engageable by said movable contact according to the direction of deflection of said movable contact; a relay having an actuating winding together with a first set of cooperating contacts and a second set of cooperating contacts, said contacts sets being respectively closed and open when said relay winding is sufficiently deenergized, and respectively open and closed when said relay winding is sufficiently energized; means comprising connections to said first contact set and established by engagement of said movable galvanometer contact with one of the associated pair of contacts for passing current in series through said relay winding and a winding of said galvanometer, the direction of flow through said galvanometer winding being in such direction as to intensify the force of engagement between said galvanometer contacts and thereby to increase the current flow through said relay winding sufficiently to open the first relay contacts set and close the second, means controlled by said second relay contact for maintaining current flow through said relay winding to maintain the relay in operated condition regardless of disengagement between said movable galvanometer contact and said one of said associated pair of contacts, and connections including said second relay contact set and established by engagement of said movable galvanometer contact with the other of said associated pair of contacts for decreasing current flow through said relay winding by concurrently passing current through said galvanometer winding in parallel with said relay winding, said flow through said galvanometer winding being in such direction as to intensify the engagement between the last mentioned galvanometer contacts and thereby to decrease the current flow through said relay winding sufficiently to cause restoration of the relay to its first position wherein said second relay contact set is open and said first relay contact set is closed.

2. In combination with a galvanometer comprising an element deflectable in a direction corresponding to a change in a variable, an electric contact movable by said element, and a pair of contacts alternatively engageable by said movable contact according to the direction of deflection of said movable contact; a relay having an actuating winding together with a first set of cooperating contacts and a second set of cooperating contacts, said contact sets being respectively closed and open when said relay winding is sufficiently deenergized and being respectively open and closed when said relay winding is sufficiently energized, means comprising connections to said first relay contact set for establishing current flow through said galvanometer upon engagement of said movable galvanometer contact with one of the associated pair of contacts to intensify the force of said engagement and for energizing said relay winding, and means comprising connections to said second relay contact set for establishing current flow through said galvanometer upon engagement of said movable galvanometer contact with the other of said pair of contacts to intensify the force of engagement therebetween and for deenergizing said relay winding.

3. In combination, a galvanometer having a neutral position and adapted to be deflected therefrom in response to changes in value of a variable, an electric contact movable by said galvanometer, relatively fixed contacts adapted to be alternatively engaged by said movable contact according to the direction of deflection of said galvanometer, a relay having a single actuating winding and a first and second contact, said relay contacts being respectively closed and open when said winding is deenergized and respectively open and closed when said winding is energized, a resistor, said relay winding being connected in series with said resistor and said second contact across the terminals of a direct current source, one terminal of said galvanometer being connected to the junction point between said winding and said resistor and another terminal of said galvanometer to said movable contact, one of said fixed contacts being connected in series with said first relay contact to one of the terminals of said source and the other of said fixed contacts directly to the other terminal of said source.

4. In combination, a galvanometer having a neutral position and adapted to be deflected therefrom in response to changes in value of a variable, an electric contact movable by said galvanometer, relatively fixed contacts adapted to be alternatively engaged by said movable contact according to the direction of deflection of said galvanometer, a relay having a single actuating winding and a first and second contact, said relay contacts being respectively closed and open when said winding is deenergized and respectively open and closed when said winding is energized, a resistor having a resistance value substantially equal to that of said relay winding, said relay winding being connected in series with said resistor and said second contact, one terminal of said galvanometer being connected to said winding and another terminal of said galvanometer to said movable contact, one of said fixed galvanometer contacts being connected in series with said first relay contact, the other of said fixed galvanometer contacts being connected to the winding of said relay.

5. In combination, a galvanometer having a neutral position and adapted to be deflected therefrom in response to changes in value of a variable, an electric contact movable by said galvanometer, relatively fixed contacts adapted to be alternatively engaged by said movable contact according to the direction of deflection of said galvanometer, a relay having a single actuating winding and a first and second contact, said relay contacts being respectively closed and open when said winding is deenergized and respectively open and closed when said winding is energized, a resistor having a resistance value substantially equal to the square of the resistance of said relay winding divided by the sum of the resistance of said relay winding and the resistance of the galvanometer coil, said relay winding being connected in series with said resistor and with one of said relay contacts, one terminal of said galvanometer being connected to said relay winding and another terminal of said galvanometer to said movable contact, one of said fixed contacts being connected in series with one of said relay contacts, and the other of said fixed contacts to said relay winding.

6. In combination with a galvanometer comprising winding means, at least a portion of which is adapted for the passage of electric current from an external source, an element carrying said winding means and deflectable in a direction corresponding to the direction of current flow in said winding means, an electric contact movable by said element, and a pair of contacts alternatively engageable by said movable contact according to the direction of deflection of said movable contact; a relay having an actuating winding, together with a first set of cooperating contacts and a second set of cooperating contacts, said contact sets being respectively closed and open when said relay winding is sufficiently deenergized, and respectively open and closed when said relay winding is sufficiently energized; means for energizing said relay winding to open said first contact set and close said second contact set, said means comprising electrical connections between said first set of relay contacts, one of said engageable galvanometer contacts, said movable galvanometer contact, and said relay winding, said connections also including at least a portion of said galvanometer winding means in circuit with said first set of relay contacts for passing an auxiliary current flow therethrough concurrently with flow of current through said relay winding and in a direction to intensify the force of engagement of said engaged galvanometer contacts until said relay winding is energized sufficiently to open said first set of relay contacts; means comprising electrical connections between said second set of relay contacts and said relay winding for maintaining said relay winding energized upon closure of said second set regardless of disengagement of said movable galvanometer contact from said one engageable galvanometer contact; and means comprising connections to the other of said engageable galvanometer contacts for deenergizing said relay winding sufficiently to close said first set of relay contacts and open said second set in response to engagement of said movable galvanometer contact with said other engageable galvanometer contact.

7. In combination with a galvanometer comprising winding means, at least a portion of which is adapted for the passage of electric current from an external source, an element carrying said winding means and deflectable in a direction corresponding to the direction of current flow in said winding means, an electric contact movable by said element, and a pair of contacts alternatively engageable by said movable contact according to the direction of deflection of said movable contact; a relay having an actuating winding, together with a first set of cooperating contacts and a second set of cooperating contacts, said contact sets being respectively closed and open when said relay winding is sufficiently deenergized, and respectively open and closed when said relay winding is sufficiently energized; means comprising connections to said first set of relay contacts, one of said engageable galvanometer contacts, and said movable galvanometer contact for establishing a current flow through said relay winding upon engagement of said one galvanometer contact by the movable galvanometer contact and for concurrently establishing a current flow through at least a portion of said galvanometer winding means in a direction to intensify the force of engagement between said galvanometer contacts until said relay winding is energized sufficiently to open said first set of relay contacts; and means including connections to the other of said engageable galvanometer contacts, said movable galvanometer contact, and said second set of relay contacts for decreasing the flow of current through said relay winding upon engagement of said movable galvanometer contact with said other galvanometer contact and for concurrently causing a current flow through at least a portion of said galvanometer winding means in such direction as to intensify the force of engagement between said last mentioned galvanometer contacts.

8. In combination with a galvanometer comprising winding means, at least a portion of which is adapted for the passage of electric current from an external source, an element carrying said winding means and deflectable in a direction corresponding to the direction of current flow in said winding means, an electric contact movable by said element, and a pair of contacts alternatively engageable by said movable contact according to the direction of deflection of said movable contact; a relay having an actuating winding, together with a first set of cooperating contacts and a second set of cooperating contacts, said contact sets being respectively closed and open when said relay winding is sufficiently deenergized, and respectively open and closed when said relay winding is sufficiently energized; means for establishing a current flow through said relay winding and for concurrently establishing an auxiliary current flow through at least a portion of said galvanometer winding means until said relay winding is energized sufficiently to open said first set of relay contacts, said means comprising connections in series with said first set of relay contacts, one of said engageable galvanometer contacts, said movable galvanometer contact, said relay winding, and at least a portion of said galvanometer winding means, said galvanometer winding means portion having one terminal connected to said movable galvanometer contact and another terminal connected to said relay winding; means comprising electrical connections between said second set of relay contacts and said relay winding for maintaining said relay winding energized upon closure of said second set regardless of disengagement of said movable galvanometer contact from said one engageable galvanometer contact; and means comprising connections to the other of said engageable galvanometer contacts and said movable galvanometer contact for deenergizing said relay winding sufficiently to close said first set of relay contacts and open said second set in response to engagement of said movable galvanometer contact with said other engageable galvanometer contact.

9. In combination with a galvanometer comprising winding means, at least a portion of which is adapted for the passage of electric current from an external source, an element carrying said winding means and deflectable in a direction corresponding to the direction of current flow in said winding means, an electric contact movable by said element, and a pair of contacts alternatively engageable by said movable contact according to the direction of deflection of said movable contact; a relay having an actuating winding, together with a first set of cooperating contacts and a second set of cooperating contacts, said contact sets being respectively closed and open when said relay winding is sufficiently deenergized, and respectively open and closed when said relay winding is sufficiently energized; means for establishing a current flow through said relay winding, said means comprising electrical connections between said first set of relay contacts, one of said engageable galvanometer contacts, said movable galvanometer contact, and said relay winding, said connections also including at least a portion of said galvanometer winding means having one terminal connected to said movable galvanometer contact and another terminal connected to said relay winding for establishing auxiliary current flow through said galvanometer winding means concurrently with the establishing of current flow through said relay winding and in a direction to intensify the force of engagement of said engaged galvanometer contacts; means comprising electrical connections between said second set of relay contacts and said relay winding for maintaining said relay winding energized upon closure of said second set regardless of disengagement of said movable galvanometer contact from said one engageable galvanometer contact; and means comprising connections to the other of said engageable galvanometer contacts and said movable galvanometer contact for shunting said relay winding to deenergize the latter sufficiently to close said first set of relay contacts and open said second set in response to engagement of said movable galvanometer contact with said other engageable galvanometer contact.

10. In combination with a galvanometer comprising winding means, at least a portion of which is adapted for the passage of electric current from an external source, an element carrying said winding means and deflectable in a direction corresponding to the direction of current flow in said winding means, an electric contact movable by said element, and a pair of contacts alternatively engageable by said movable contact according to the direction of deflection of said movable contact; a relay having an actuating winding, together with a first set of cooperating contacts and a second set of cooperating contacts, said contact sets being respectively closed and open when said relay winding is sufficiently deenergized, and respectively open and closed when said relay winding is sufficiently energized; means for energizing said relay winding to open said first contact set and close said second contact set and for passing an auxiliary current flow through at least a portion of said galvanometer winding means concurrently with said energization of said relay winding, said means comprising connections in series with said first set of relay contacts, one of said engageable galvanometer contacts, said movable galvanometer contact, said relay winding, and at least a portion of said galvanometer winding means; means comprising electrical connections between said second set of relay contacts and said relay winding for maintaining said relay winding energized upon closure of said second set regardless of disengagement of said movable galvanometer contact from said one engageable galvanometer contact; and means comprising connections to the other of said engageable galvanometer contacts and said movable galvanometer contact for shunting said relay winding to deenergize the latter sufficiently to close said first set of relay contacts and open said second set in response to engagement of said movable galvanometer contact with said other engageable galvanometer contact.

11. In combination with a galvanometer comprising winding means, at least a portion of which is adapted for the passage of electric current from an external source, an element carrying said winding means and deflectable in a direction corresponding to the direction of current flow in said winding means, an electric contact movable by said element, and a pair of contacts alternatively engageable by said movable contact according to the direction of deflection of said movable contact; a relay having an actuating winding, together with a first set of cooperating contacts and a second set of cooperating contacts, said contact sets being respectively closed and open when said relay winding is sufficiently deenergized, and respectively open and closed when said relay winding is sufficiently energized; means for energizing said relay winding to open said first contact set and close said second contact set and for passing an auxiliary current flow through at least a portion of said galvanometer winding means concurrently with said energization of said relay winding, said means comprising connections in series with said first set of relay contacts, one of said engageable galvanometer contacts, said movable galvanometer contact, said relay winding, and at least a portion of said galvanometer winding means; means comprising electrical connections between said second set of relay contacts and said relay winding for maintaining said relay winding energized upon closure of said second set regardless of disengagement of said movable galvanometer contact from said one engageable galvanometer contact; and means comprising connections in series with the other of said engageable galvanometer contacts, said movable galvanometer contact and at least a portion of said galvanometer winding means for shunting said relay winding to deenergize the latter sufficiently to close said first set of relay contacts and open said second set and for causing a current flow through at least a portion of said galvanometer winding means in a direction to intensify the force of engagement between said movable galvanometer contact and said other engageable galvanometer contact.

12. The combination defined by claim 6, together with a resistor in series with said relay winding, said resistor having a resistance value substantially equal to the square of the resistance of said relay winding divided by the sum of the resistance of said relay winding and the resistance of the galvanometer winding means between said relay winding and said movable galvanometer contact.

13. In combination, a galvanometer having a neutral position and adapted for deflection in response to changes in value of a variable, an electric contact movable by said galvanometer, contacts alternatively engageable by said movable contact according to the direction of deflection of said galvanometer, a relay having single actuating winding together with a first set of cooperating contacts and a second set of cooperating contacts, said contact sets being respectively closed and open when said relay winding is sufficiently deenergized, and respectively open and closed when said relay winding is sufficiently energized; means comprising connections to said first set of relay contacts, one of said engageable galvanometer contacts, and said movable galvanometer contact for establishing a flow of current through said relay winding upon engagement of said one galvanometer contact by the movable galvanometer contact and for concurrently establishing a current flow through a winding of said galvanometer in a direction to intensify the force of engagement between said galvanometer contacts until said relay winding is energized sufficiently to open said first set of relay contacts; and means including connections to said second set of relay contacts, said movable galvanometer contact, and the other of said engageable galvanometer contacts for decreasing the flow of current through the said relay winding upon engagement of said movable galvanometer contact with said other engageable galvanometer contact and for concurrently causing a current flow through said galvanometer winding in a direction to intensify the force of engagement between said last mentioned galvanometer contacts.

FRANKLIN B. BRISTOL.

REFERENCES CITED

The following references are of record in the file of this patent:

UNITED STATES PATENTS

| Number | Name | Date |
|---|---|---|
| 2,189,846 | Valtat | Feb. 13, 1940 |